United States Patent
Choi et al.

(10) Patent No.: US 11,549,622 B2
(45) Date of Patent: Jan. 10, 2023

(54) SEALING DEVICE FOR HYPER TUBE

(71) Applicant: Korea Railroad Research Institute, Uiwang-si (KR)

(72) Inventors: JaeHeon Choi, Anyang-si (KR); KwanSup Lee, Gunpo-si (KR); SuYong Choi, Suwon-si (KR); JinHo Lee, Seoul (KR); YongJun Jang, Suwon-si (KR); ChangYoung Lee, Bucheon-si (KR); LeeHyeon Kim, Uiwang-si (KR); MinHwan Ok, Uiwang-si (KR); JungYoul Lim, Seoul (KR); JeongMin Jo, Suwon-si (KR)

(73) Assignee: KOREA RAILROAD RESEARCH INSTITUTE, Uiwang-si (KR)

( * ) Notice: Subject to any disclaimer, the term of this patent is extended or adjusted under 35 U.S.C. 154(b) by 373 days.

(21) Appl. No.: 16/652,491

(22) PCT Filed: Dec. 5, 2018

(86) PCT No.: PCT/KR2018/015346
§ 371 (c)(1),
(2) Date: Mar. 31, 2020

(87) PCT Pub. No.: WO2019/225825
PCT Pub. Date: Nov. 28, 2019

(65) Prior Publication Data
US 2020/0284348 A1    Sep. 10, 2020

(30) Foreign Application Priority Data
May 21, 2018   (KR) .......................... 10-2018-0057650

(51) Int. Cl.
*F16L 17/10*    (2006.01)
*F16J 15/46*    (2006.01)
(Continued)

(52) U.S. Cl.
CPC ............... *F16L 17/10* (2013.01); *F16J 15/46* (2013.01); *B61B 13/10* (2013.01); *F16J 15/06* (2013.01); *F16L 2201/30* (2013.01)

(58) Field of Classification Search
CPC .......... F16J 15/022; F16J 15/027; F16J 15/46; F16L 17/02; F16L 17/06; F16L 17/067; F16L 17/10; F16L 2201/30; B61B 13/10
See application file for complete search history.

(56) References Cited

U.S. PATENT DOCUMENTS 1,800,085 A * 4/1931 Kroeger .................. F16L 17/10
184/105.3
2,814,514 A * 11/1957 Beatty ..................... F16L 17/10
285/97
(Continued)

FOREIGN PATENT DOCUMENTS

JP       5-033869 A      2/1993
JP       09133272 A  *  5/1997
(Continued)

OTHER PUBLICATIONS

International Search Report for PCT/KR2018/015346 dated Mar. 14, 2019 [PCT/ISA/210].
(Continued)

*Primary Examiner* — Nicholas L Foster
(74) *Attorney, Agent, or Firm* — Sughrue Mion, PLLC

(57) ABSTRACT

The present disclosure provides a sealing apparatus for use in a hypertube, which includes a first tube, a second tube having one end connected to an end of the first tube, and a gasket including a seal made of a fiber structure formed with a space that is filled with a sealing fluid, wherein the gasket is configured to seal a space between the first tube and the second tube.

8 Claims, 3 Drawing Sheets

(51) Int. Cl.
*F16J 15/06* (2006.01)
*B61B 13/10* (2006.01)

(56) References Cited

U.S. PATENT DOCUMENTS

| | | | | |
|---|---|---|---|---|
| 2,816,780 | A * | 12/1957 | Ross | F16L 17/10 |
| | | | | 285/283 |
| 3,722,556 | A * | 3/1973 | Jeffers | B67D 7/78 |
| | | | | 141/2 |
| 3,955,822 | A * | 5/1976 | Irby | F16J 15/004 |
| | | | | 277/513 |
| 4,819,565 | A * | 4/1989 | Bechu | B61D 17/22 |
| | | | | 105/11 |
| 5,102,150 | A * | 4/1992 | Kahn | F16L 27/1021 |
| | | | | 277/927 |
| 6,328,310 | B1 | 12/2001 | Chikaraishi | |
| 8,393,649 | B2 * | 3/2013 | Kitaguchi | F16L 23/167 |
| | | | | 285/368 |
| 8,794,639 | B2 * | 8/2014 | Westhoff | F16J 15/46 |
| | | | | 277/645 |
| 10,619,763 | B2 * | 4/2020 | Baugh | G01M 3/2815 |
| 11,320,070 | B2 * | 5/2022 | Choe | F16J 15/40 |
| 11,421,809 | B2 * | 8/2022 | Pearse | B61B 13/10 |
| 2001/0045699 | A1 * | 11/2001 | McKenrick | F16L 17/10 |
| | | | | 277/314 |
| 2010/0148452 | A1 * | 6/2010 | Westhoff | F16J 15/48 |
| | | | | 277/645 |
| 2011/0012338 | A1 * | 1/2011 | Kitaguchi | F16L 23/167 |
| | | | | 285/10 |
| 2017/0254456 | A1 * | 9/2017 | Pearse | F16L 27/12 |
| 2019/0242497 | A1 * | 8/2019 | Baugh | F16L 21/08 |
| 2020/0239036 | A1 * | 7/2020 | Lee | B60L 13/10 |
| 2020/0362995 | A1 * | 11/2020 | Choe | F16L 21/02 |

FOREIGN PATENT DOCUMENTS

| | | |
|---|---|---|
| JP | 9133272 A | 5/1997 |
| JP | 2000-220752 A | 8/2000 |
| JP | 2005-016722 A | 1/2005 |
| JP | 3921208 B2 | 5/2007 |
| KR | 10-2010-0113597 A | 10/2010 |
| WO | 2009/118961 A1 | 1/2009 |

OTHER PUBLICATIONS

Communication dated May 25, 2021, from the European Patent Office in application No. 18919568.8.

* cited by examiner

SEALING DEVICE FOR HYPER TUBE

CROSS REFERENCE TO RELATED APPLICATIONS

This application is a National Stage of International Application No. PCT/KR2018/015346 filed Dec. 5, 2018, claiming priority based on Korean Patent Application No. 10-2018-0057650 filed May 21, 2018.

TECHNICAL FIELD

The present disclosure relates to a sealing apparatus for a hypertube.

BACKGROUND

The statements in this section merely provide background information related to the present disclosure and do not necessarily constitute prior art.

There are efforts to realize a hypertube system which is an ultra-high-speed vacuum train system capable of greatly improving a vehicle speed by minimizing air resistance through a vehicle tube conditioned close to a vacuum. To install the hypertube system requires constructing a vacuum or near-vacuum tunnel (tube). Such a tube needs to be formed to a greatly extended length, which involves connecting a plurality of tube units. The tunnel is vulnerable at fittings between tube units to an inflow of external air which is supposed to be blocked to maintain the near-vacuum state inside the tunnel. The primary interest of the hypertube system is to closely maintain the sealing of the tube.

Among well known sealing technologies are welding together tubes of metals such as carbon steel, stainless steel, aluminum or the like, arranging tube sections of a groove type, a metal bellows type, polyethylene or other polymer materials with an elastomer gasket interposed to establish a closed tunnel, and a method of filling gaps between the tube sections by using an adhesive such as epoxy, silicone, or the like.

However, the sealing methods using welding or adhesive are susceptible to thermal deformation occurring in the tube due to the temperature difference between the seasons and between day and night, leading to degraded buffering and damage at the fittings accompanied by their premium construction costs. On the other hand, the gasket-based sealing method bears the property of an elastomer such as epoxy, silicone, etc. which when subjected to an extended fastening pressure exhibits a compression deformation that reduces the thickness of the sealing areas, thereby degrading sealing performance.

DISCLOSURE

Technical Problem

According to some embodiments of the present disclosure, a sealing apparatus for use in a hypertube and a gasket for sealing a hypertube are aimed to improve the sealing of the hypertube by maintaining the sealing inside the hypertube by using a sealing fluid.

In addition, the present disclosure in at least one embodiment seeks to maintain the sealing efficiency of the hypertube regardless of changes in the external environment such as temperature among other factors.

In addition, the present disclosure in at least one embodiment seeks to obviate the need for an additional method for inspecting the sealing of the tube.

In addition, other challenges to be solved by the sealing apparatus for the hypertube and the gasket for sealing the hypertube according to some embodiments of the present disclosure can be derived readily from the description herein.

SUMMARY

At least one embodiment of the present disclosure provides a sealing apparatus used in a hypertube, which includes a first tube, a second tube having one end connected to an end of the first tube, and a gasket including a seal made of a fiber structure formed with a space that is filled with a sealing fluid, wherein the gasket is configured to seal a space between the first tube and the second tube.

DETAILED DESCRIPTION

Figure 1:
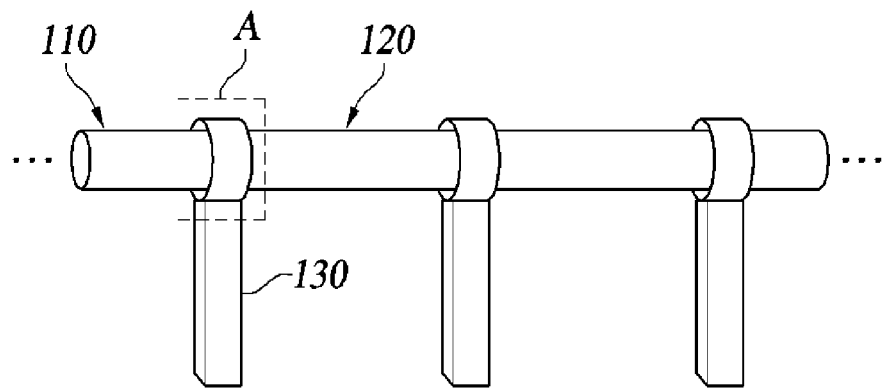
FIG. 1 is a view showing a structure of a hypertube including a sealing apparatus for a hypertube according to some embodiments of the present disclosure.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

In describing components of some embodiments of the present disclosure, various terms such as first, second, A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not to exclude thereof unless specifically stated to the contrary.

As used herein, a 'tube' refers to at least one of a first tube 110 and a second tube 120. In addition, 'fluid' may be used to refer to a sealing fluid.

Figure 2:
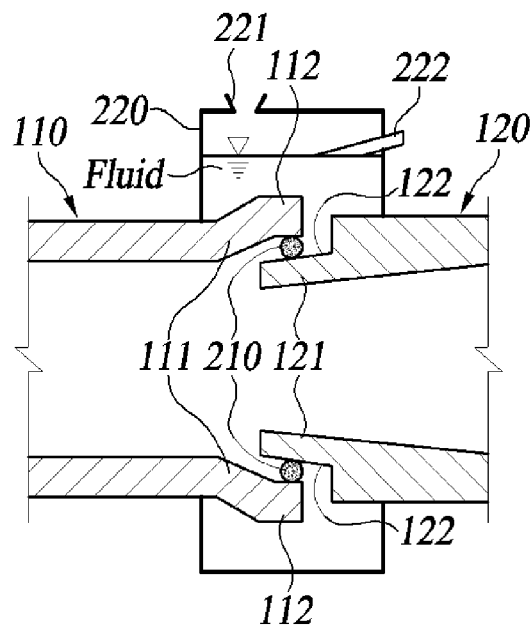
FIG. 2 is an enlarged longitudinal sectional view of portion A of FIG. 1.

Referring to FIGS. 1 and 2, a sealing apparatus for use in a hypertube and a gasket 210 for sealing a hypertube according to some embodiments of the present disclosure will be described.

FIG. 1 is a view showing a structure of a hypertube including a sealing apparatus for a hypertube according to some embodiments of the present disclosure. Specifically, FIG. 1 shows the first tube 110 and the second tube 120 as being supported by a pier 130.

FIG. 2 is an enlarged longitudinal sectional view of portion A of FIG. 1.

The structure of the hypertube according to at least one embodiment of the present disclosure includes at least the first tube 110, second tube 120, and gasket 210. The present disclosure may further include a fluid tank 220 for storing a sealing fluid, a sealing fluid leakage sensor 222 for detecting whether the sealing fluid is discharged from the fluid tank 220, and the like.

The first tube 110 and the second tube 120 have their respective ends disposed adjacent to each other so that they may be interconnected. The hypertube needs to have its internal space maintain the near-vacuum state, and the first tube 110 and the second tube 120 need to be tightly closed to block the inflow of external air. The first tube 110 and the second tube 120 are in the form of a circular tube having a diameter for allowing an ultra-high-speed train to pass. For example, the diameter of the tube may be approximately 2 to 3 m.

The tube may be made of a metal material such as carbon steel, stainless steel, aluminum, a mixed material from a mixture of steel and concrete, a polymer material such as fiber-reinforced plastic (FRP), polyethylene (PE), and the like.

The first tube 110 and the second tube 120 according to the present embodiment are respectively formed at their adjacent ends with a female connection portion 111 and a male connection portion 121. The female connection portion 111 and the male connection portion 121 are formed to be engaged with each other. To this end, the diameter of the inner circumferential surface of the female connection portion 111 is larger than the diameter of the outer circumferential surface of the male connection portion 121, and the male connection portion 121 of the second tube 120 is fitted into the female connection portion 111 of the first tube 110. Meanwhile, a coupling margin may be formed between the first tube 110 and the second tube 120 to buffer a change in length due to thermal deformation. Here, the coupling margin refers to a clearance formed between the first tube 110 and the second tube 120. By forming the coupling margin, the first tube 110 and the second tube 120 are not damaged even when they are thermally expanded by an external temperature change.

In order to smoothly couple the female connection portion 111 with the male connection portion 121, the female connection portion 111 may be formed with a flange 112 at an end thereof so as to gradually increase the diameter of the inner circumferential surface thereof toward the end portion. The male connection portion 121 may be formed with a groove 122 on the outer circumferential surface thereof so as to gradually reduce the diameter of the inner circumferential surface thereof toward the end portion. The flange 112 of the first tube 110 and the groove 122 of the second tube 120 are coupled to each other, and the gasket 210 is installed in a space between the flange 112 and the groove 122, thereby sealing the connection portions of both tubes.

The fluid tank 220 stores the sealing fluid. An illustrative configuration in which the fluid tank 220 is combined with the first tube 110 and the second tube 120 will be described in the present embodiment. However, as long as the fluid tank 220 is capable of supplying fluid to the space between the first tube 110 and the second tube 120, and the installation position or the installation method thereof may be different.

As shown in FIG. 2, the fluid tank 220 may be disposed to surround a space established between the first tube 110 and the second tube 120 at their junction. However, as long as the fluid tank 220 is capable of supplying fluid to the space between the first tube 110 and the second tube 120, and the installation position or the installation method thereof may be different. The sealing fluid may permeate through the gasket 210 into its seal 212 to substantially fill a space between structured fibers of the seal 212 and thereby improves the sealing function of the gasket 210. Since the internal pressure of the tube is lower than that of the outside of the tube, the pressure difference between the inside of the tube and the outside thereof further facilitates the movement of the sealing fluid to the gasket 210.

In this embodiment, the sealing fluid is used for improving the sealing function of the gasket 210, and the sealing fluid itself can serve as a barrier layer. In other words, since the sealing fluid exists both internally and externally of the fluid tank 220 surrounding the junction between the first tube 110 and the second tube 120, external air cannot penetrate into the inside of the hypertube due to the presence of the sealing fluid. In this case, even if a crack or another damage occurs in the first tube 110, the second tube 120, and the junction therebetween, the sealing fluid can provide a sealing enhancement, thereby contributing to a double sealing structure.

The sealing fluid is preferably a liquid having high viscosity and may be, for example, a silicone oil or other high viscosity sealing fluid. Water may also be used as the sealing fluid. When water is used as the sealing fluid, rainwater or the like may be introduced through an opening 221 disposed in the fluid tank 220 to perform a sealing function. Water used as a sealing fluid may not be high in viscosity, but it definitely has advantages in terms of cost and maintenance.

The opening 221 disposed in the fluid tank 220 is covered by a separate cover (not shown). The cover normally protects the opening 221 from the inflow of foreign materials before they are introduced into the fluid tank 220. When rainwater or the like needs to be introduced into the fluid tank 220, it may be allowed to enter the fluid tank 220 by opening the cover, thereby filling the necessary sealing fluid.

Meanwhile, to control the viscosity of the sealing fluid, at least one of the fine particles (powder) and the short fibers may be included in the sealing fluid. The sealing fluid may include at least one or both of a volatile fluid and a non-volatile fluid. When a volatile fluid and a non-volatile fluid are mixed and used, non-volatile fluid is placed on the upper portion of the volatile fluid due to their specific gravity difference, thereby advantageously preventing evaporation of the volatile fluid. On the other hand, when the non-volatile fluid is used, since the fluid is not lost due to evaporation, the maintenance cycle can be made longer.

The sealing fluid leakage sensor 222 may be provided inside the fluid tank 220 to measure the remaining amount of the sealing fluid. In this case, measuring the volume or level of the sealing fluid may determine when the volume or level of the sealing fluid is below a certain value so that the sealing fluid can be determined to leak. As such, the simple measurement of the volume or level of the sealing fluid through the sealing fluid leakage sensor 222 can detect the leakage of the sealing fluid in real-time without the need for a separate device for checking the sealing state.

Figure 3:
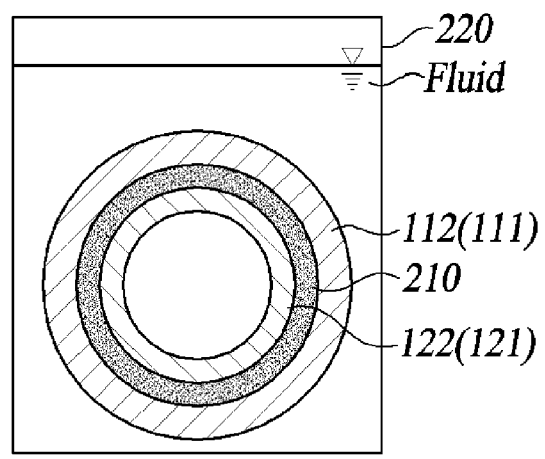
FIG. 3 is an enlarged cross-sectional view of portion A of FIG. 1.

Referring to FIG. 3, a configuration for sealing the junction between the first tube 110 and the second tube 120 by the gasket 210 will be described.

FIG. 3 is an enlarged cross-sectional view of portion A of FIG. 1.

The gasket 210 is positioned in a space between the first tube 110 and the second tube 120 to serve as a sealing member, thereby preventing the inflow of air or foreign substances into the inside of the hypertube. In at least one illustrative embodiment, as shown in FIGS. 2 and 3, the gasket 210 is disposed between the inner circumferential surface of the female connection portion 111 of the first tube 110 and the outer circumferential surface of the male connection portion 121 of the second tube 120. Specifically, the gasket 210 is interposed between the inner circumferential surface of the flange 112 formed at the end portion of the female connection portion 111 of the first tube 110 and the outer circumferential surface of the male connection portion 121 of the second tube 120 so as to seal the junction between the first tube 110 and the second tube 120.

The configurations of the gasket 210 in some embodiments of the present disclosure will be described with reference to FIGS. 4A and 4B.

Figure 4A:
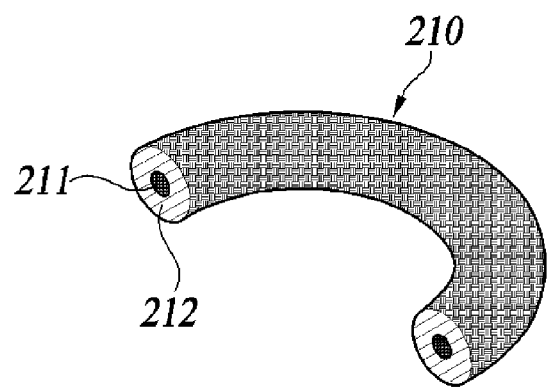
FIGS. 4A and 4B illustrate cross-sectional views of gaskets for sealing a hypertube according to some embodiments of the present disclosure.
Figure 4B:
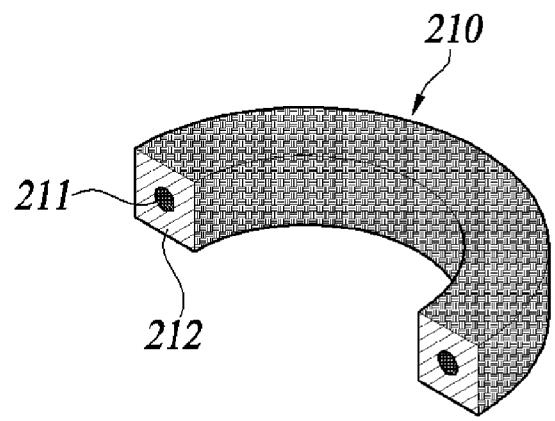

FIGS. 4A and 4B illustrate cross-sectional views of gaskets 210 for sealing a hypertube according to some embodiments of the present disclosure.

The gasket 210 may include a seal 212 formed of a fiber structure. The seal 212 may be made of glass fibers or carbon fibers when considering sealing performance and durability but may be made of other materials having a sealing function. Specifically, the seal 212 may be made of a material having a single fiber structure or of a plurality of materials mixed or combined. When the seal 212 is made of a material having a fiber structure as in the present embodiment, there is a less creep or deformation compared to the case of using a polymer or an elastomer, thereby facilitating maintenance and repair. The seal 212 is filled at its structured fibers with the sealing fluid to provide the fiber structure with the contained sealing fluid, resulting in a further improved sealing function.

Meanwhile, the gasket 210 may include a core 211 surrounded by the seal 212 to reinforce the mechanical strength of the gasket 210. In this case, the core 211 serves as a support for maintaining a structural shape, i.e., an annular shape, of the gasket 210. Accordingly, the core 211 can be made of, for example, a polymer or a metal material.

The cross-section of the gasket 210 is formed in a circular shape as shown in FIG. 4A. When the cross-section of the gasket 210 is circular, the gasket 210 is easily inserted in the junction between the first tube 110 and the second tube 120.

In addition, the cross-section of the gasket 210 may be rectangular, as shown in FIG. 4B. When the gasket 210 is formed in a rectangular shape, the area where the outer circumferential surface of the gasket 210 contacts the inner circumferential surface of the first tube 110 and the area where the inner circumferential surface of the gasket 210 contacts the outer circumferential surface of the second tube 120 become wider, thereby making the sealing more intimate. It should be understood that the cross-section of the gasket 210 may have a shape other than a circle or a rectangle.

A configuration in which the fluid tank and the gasket are separated according to at least one embodiment of the present disclosure will be described with reference to FIG. 5.

Figure 5:
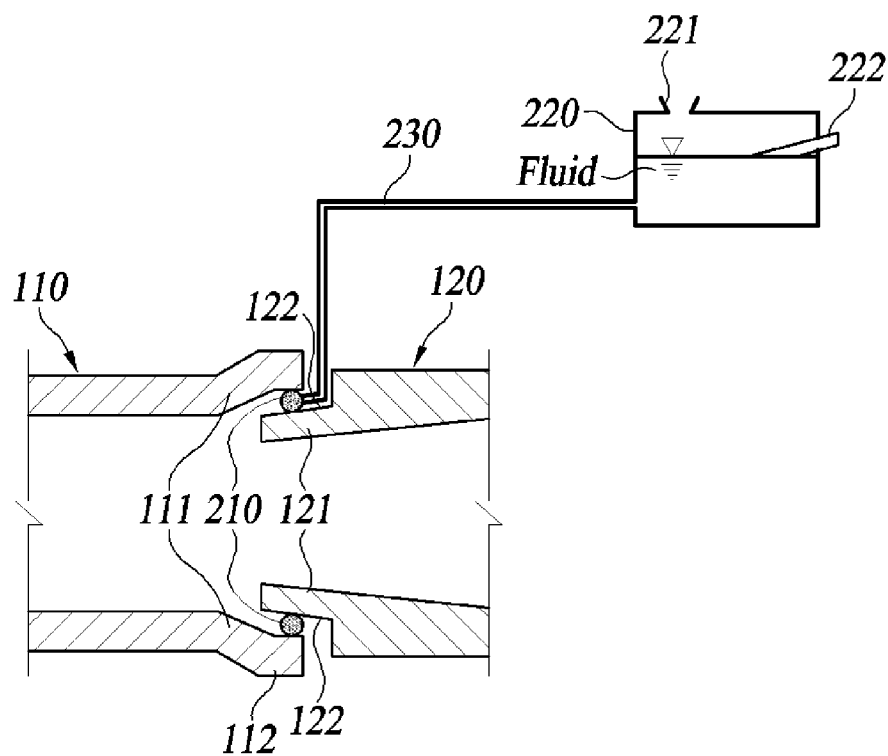
FIG. 5 is a view showing an interconnection of a fluid tank with a gasket via a sealing fluid supply means according to some embodiments of the present disclosure.

FIG. 5 is a view showing an interconnection of a fluid tank 220 with a gasket 210 via a sealing fluid supply means 230 according to some embodiments of the present disclosure.

The present embodiment of the present disclosure features an arrangement of the fluid tank 220 different from the embodiment shown in FIG. 2 in that the sealing fluid is supplied by a separate sealing fluid supply means 230. It will be appreciated that the configuration of the present embodiment may include other configurations described herein in the context of the embodiment shown in FIG. 2 without contradicting the foregoing description. The fluid tank 220 of the present embodiment may be disposed apart from the gasket 210. In at least one illustrative embodiment, the sealing fluid supply means 230 may be a conduit, and the sealing fluid stored in the fluid tank 220 may be introduced into the gasket 210 through the sealing fluid supply means 230.

While exemplary embodiments of the technical idea of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations.

It is intended that the scope of protection of the embodiments disclosed be interpreted by the following claims, and one of ordinary skill would understand the scope of the claimed invention is not to be limited by the above explicitly described embodiments but by the claims and equivalents thereof.

REFERENCE NUMERALS

110: first tube
111: female connection portion
112: flange
120: second tube
121: male connection portion
122: groove
130: pier
210: gasket
211: core
212: seal
220: fluid tank
221: opening
222: sealing fluid leakage sensor
230: sealing fluid supply means

The invention claimed is:

1. A sealing apparatus for use in a hypertube ultra-high-speed vacuum train system, the sealing apparatus comprising:
   a first tube and a second tube having one end connected to an end of the first tube;
   a gasket comprising a seal made of a fiber structure formed with a space that is filled with a sealing fluid, wherein the gasket is located in a radial space between the first tube and the second tube to maintain a seal between a vacuum or near-vacuum inside the first and second tubes and an atmosphere outside of the first and second tubes;
   a fluid tank that is outside of the gasket and configured to store the sealing fluid; and
   a sealing fluid leakage sensor configured to check a remaining amount of the sealing fluid in the fluid tank.

2. The sealing apparatus of claim 1, wherein the fluid tank is configured to supply the sealing fluid to the gasket such that at least a portion of the sealing fluid contacts the gasket.

3. The sealing apparatus of claim 1, wherein the sealing fluid is silicone oil.

4. The sealing apparatus of claim 1, wherein the fiber structure of the seal comprises a glass fiber or a carbon fiber material.

5. The sealing apparatus of claim 1, further comprising:
a conduit configured to interconnect the fluid tank and the gasket and to supply the sealing fluid from the fluid tank to the gasket such that at least a portion of the sealing fluid contacts the gasket.

6. The sealing apparatus of claim 1, wherein the gasket has:
a circular cross-section;
an outer circumferential surface configured to be in contact with an inner circumferential surface of the first tube; and
an inner circumferential surface configured to be in contact with an outer circumferential surface of the second tube.

7. The sealing apparatus of claim 1, wherein the gasket has:
a rectangular cross-section;
an outer circumferential surface configured to be in contact with an inner circumferential surface of the first tube; and
an inner circumferential surface configured to be in contact with an outer circumferential surface of the second tube.

8. A hypertube ultra-high-speed vacuum train system, comprising:
a first tube;
a second tube having one end connected to an end of the first tube, a fluid tank that is outside of the gasket, coupled to the first tube and the second tube, and configured to store a sealing fluid;
a gasket comprising a seal made of a fiber structure formed with a space that is filled with the sealing fluid, wherein the gasket is located in a radial space between the first tube and the second tube to maintain a seal between a vacuum or near-vacuum inside the first and second tubes and an atmosphere outside of the first and second tubes; and
a sealing fluid leakage sensor configured to check a remaining amount of the sealing fluid in the fluid tank.

* * * * *